Jan. 9, 1940.   J. L. SWEENEY ET AL   2,186,048
TYPEWRITER
Filed Oct. 15, 1936    3 Sheets-Sheet 2

Inventor
J. Lee Sweeney,
and Harry Bates
By Seymour, Bright & Nottingham
Attorneys Jan. 9, 1940.    J. L. SWEENEY ET AL    2,186,048
TYPEWRITER
Filed Oct. 15, 1936    3 Sheets-Sheet 3
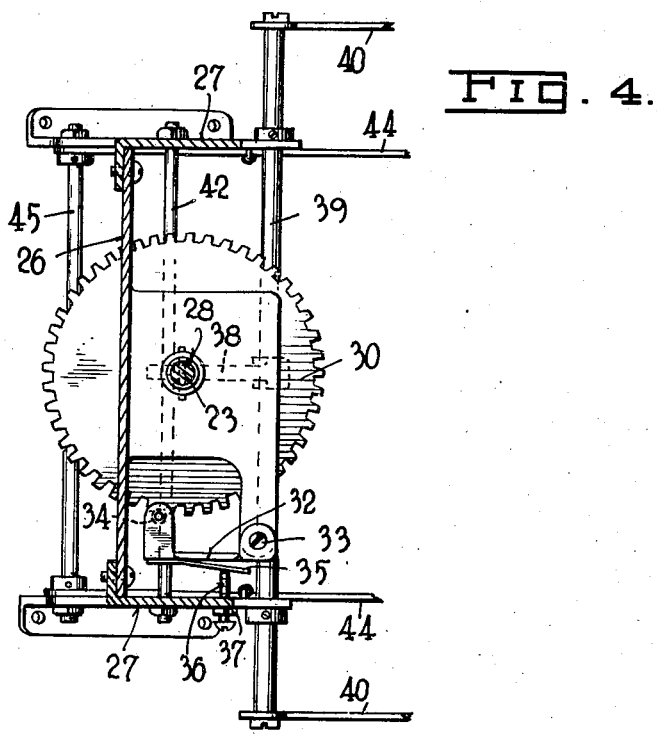
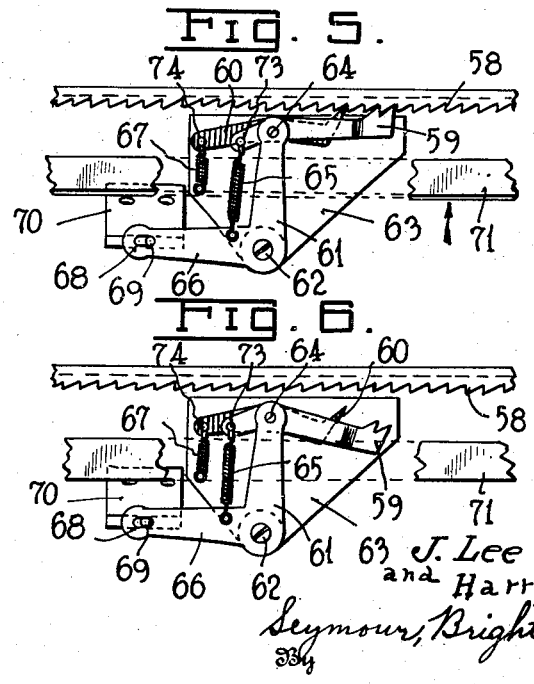
Inventor
J. Lee Sweeney,
and Harry Bates
By Seymour, Bright & Nottingham
Attorneys Patented Jan. 9, 1940

2,186,048

UNITED STATES PATENT OFFICE 2,186,048

TYPEWRITER

J. Lee Sweeney and Harry Bates, New York, N. Y., assignors to Bates Laboratories, Inc., New York, N. Y.

Application October 15, 1936, Serial No. 105,790

18 Claims. (Cl. 197—45)

This invention relates to improvements in typewriters and more particularly to typewriters of the class employing a movable type unit which supports all of the type characters.

The primary purpose of the invention is to provide a typewriter especially adapted for the teaching of typing.

Another object is to supply a typewriter for educational purposes having a dummy keyboard bearing reference characters arranged to simulate the keys of a standard keyboard and also having a row of the same characters positioned to correspond with the characters on the dummy keyboard and to cooperate with a pointer to enable the typist to readily bring any particular character into position to be typed.

A still further object is to furnish a typewriter of such simple inexpensive and durable construction that it may be sold at a small price and may be roughly handled without getting out of order.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 4 is a longitudinal view of a detail on the line 4—4 of Fig. 3.

Figs. 5 and 6 are plan views partly broken away of details of the escapement mechanism.

Figure 1:
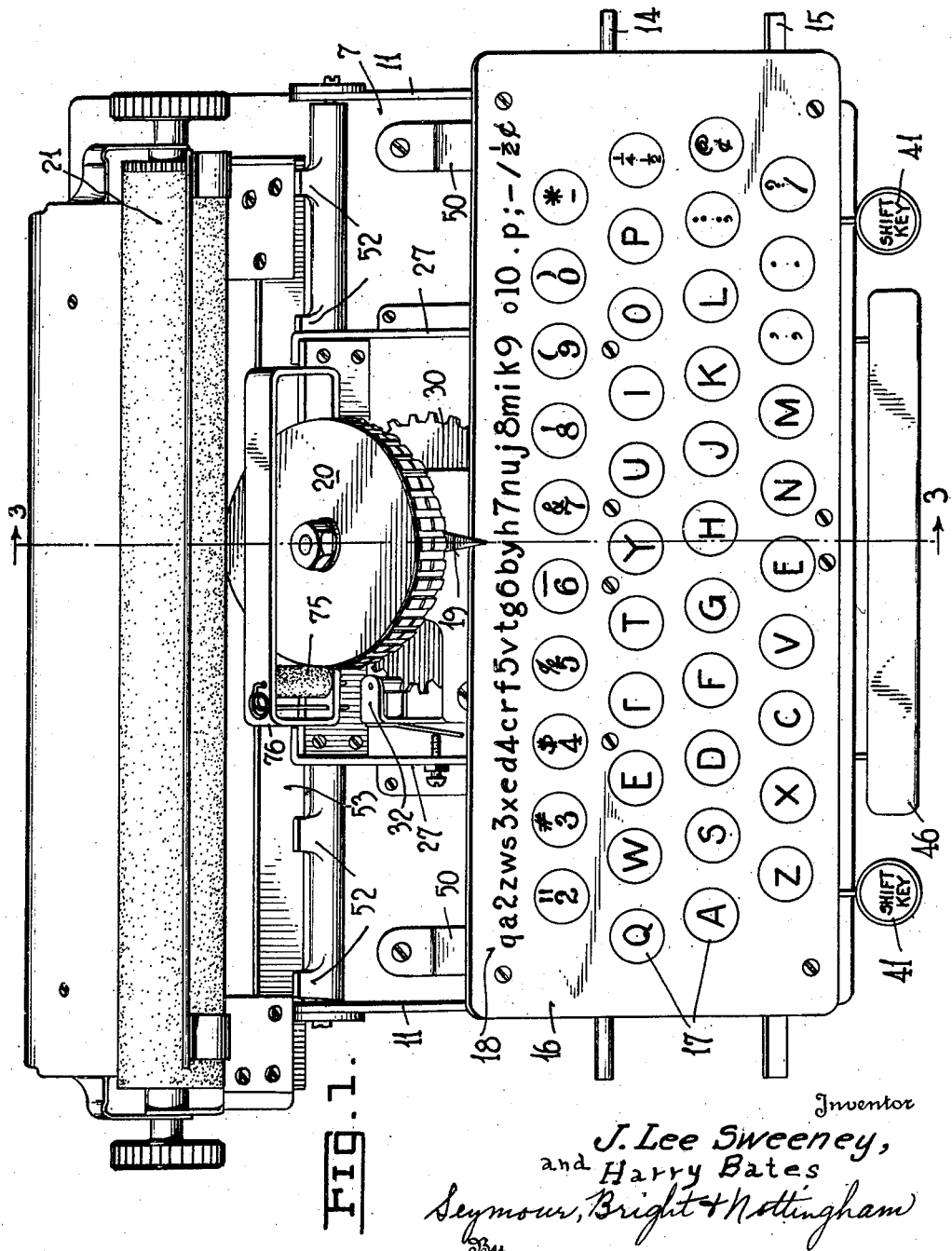
Fig. 1 is a top plan view of one embodiment of the invention.
Figure 2:
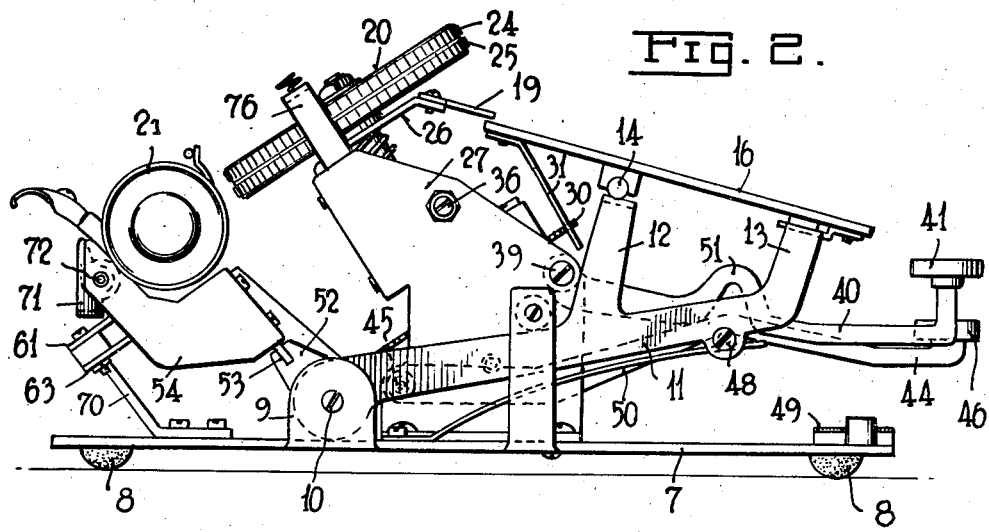
Fig. 2 is a side elevation of the same.

Referring to the drawings, 7 designates a base plate of sheet metal or the like supported on short resilient legs or knobs 8. Oppositely disposed posts 9, preferably integral with the base plate, project upwardly therefrom and support a shaft 10. Oppositely disposed levers 11 are mounted on the shaft and arranged to rock about the axis thereof, and the outer ends of these levers are fork shaped so as to provide upstanding extensions 12 and 13. The extensions 12 are fixedly secured to a horizontally disposed guide rod 14, and the extensions 13 carry a similarly disposed guide plate 15. The members 14 and 15 act as guides and supports for a laterally shiftable as well as depressible dummy keyboard 16, which is best shown in Fig. 1. From that figure, it will be noted that the face of the keyboard bears characters 17 arranged to simulate a standard keyboard, and near the upper edge of the part 16 we place a row of characters 18 which correspond with the characters 17. As the characters 18 coincide with the characters 17, it will be obvious that when any one of the characters 17 is brought into register with a fixed pointer 19, the corresponding character in the row 18 will also register with the pointer.

At this point it may be stated that lateral shifting of the keyboard 17 functions to move or rotate a type unit 20 while depression of the keyboard acts to move the platen 21 into contact with the type member 20.

Referring to the type unit it will be noted that in the present embodiment it is in the form of a wheel 22 fixedly mounted on a shaft 23. The periphery of the wheel is provided with an annular row 24 of lower case type and a second annular row 25 of upper case type.

The shaft 23 is rotatably mounted and axially movable in a suitable support 26 which may be in the form of an U-shaped piece of sheet metal having its ends secured to oppositely disposed brackets 27 which are integral with and extend upwardly from the base plate 7.

A coil spring 28 encircles the shaft and has one of its ends bearing upon the upper portion of the member 26 and its other end bearing against the pin 29 on the shaft, for normally holding the latter in depressed condition where the lower case type will cooperate with the paper on the platen 21. A cog wheel 30 is fixed to the lower end of the shaft and cooperates with the slotted rack bar 31 fixed to the bottom of the keyboard 16. It will be obvious from the above that when the board is shifted laterally, the rack 31 will rotate the cog wheel 30 and through the medium of the shaft 23 will cause corresponding movement of the type wheel 22.

In order to yieldingly lock the type wheel in any position into which it has been moved, we provide a detent 32 (Fig. 4) that is pivotally mounted at 33 on the member 26, and is provided at its free end with a roller 34 which cooperates with the teeth of the cog wheel. A leaf spring 35 is secured to the detent and functions to maintain the roller in engagement with the cog wheel, and any suitable means, such as a screw 36, is employed to adjust the tension of the spring. The screw 36 is threaded into one of the brackets 27 and it is preferably provided with a lock nut 37.

For the purpose of moving the shaft 23 and the type wheel upwardly to allow the upper case type to cooperate with the platen, the lower end of the shaft is engaged by an arm 38 fixed to the central portion of a rock shaft 39 journaled in the brackets 27.

Oppositely disposed arms 40 are fixed to the rock shaft and carry shift keys 41 at their outer ends. Depression of either one of the shift keys causes the members 40 and 38 to move in a clockwise direction and this results in elevation of the type wheel 22. The arm 38 is normally held depressed and in contact with a stop 42 by means of a coil spring 43 having one of its ends secured to the arm and its other end secured to the base plate.

For the purpose of spacing, another pair of oppositely disposed arms 44 have their inner ends pivotally connected at 45 to the brackets 27 and carry at their outer ends a shift bar 46. These arms are normally held in an elevated position by means of coil springs 47 having their upper ends connected to the brackets 27 and their lower ends secured to the arms. When the bar is depressed, it causes corresponding movement of a rod 48 which has its ends secured to the levers 11, but downward movement of the arms 44 is limited by the arms coming into contact with stop surfaces 49 on the base plate. Leaf springs 50 having their inner ends secured to the base plate, bear against the rod 48, for normally holding the false keyboard in normal position, and cooperate with the spring 43 to hold the shift bar 46 elevated.

At this point it will be noted that the arms 40 have inverted U-shaped portions 51 which allow the shift keys 41 to be depressed without lowering the rod 48.

Figure 3:
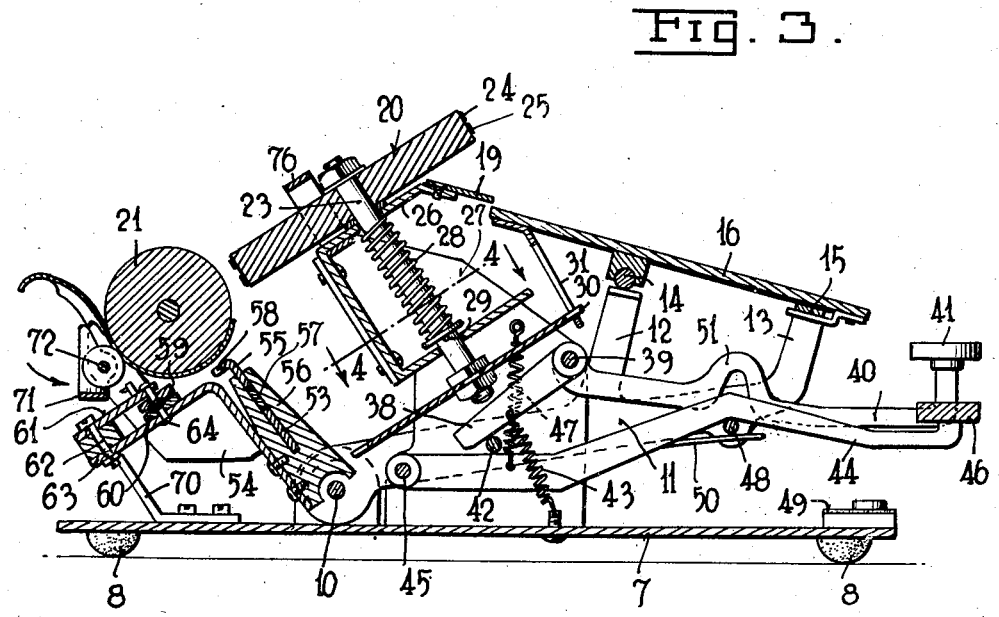
Fig. 3 is a transverse vertical sectional view taken on the line 3—3 of Fig. 1.

The pivotal ends of the levers 11 carry lugs 52 in which slides a rail 53 of the platen carriage 54, and as best shown in Fig. 3, the upper rail 55 of said carriage also slides in an arm 56 mounted at the medial portion of the shaft 10, for movement with the arms 11. A stop 57 is arranged between the rails of the platen carriage and is carried by the arm 56 for limiting lateral shifting of the platen carriage in the well known manner. For escapement purposes the rail 55 has a conventional rack 58 which cooperates (Figs. 5 and 6) with an advancing pawl 59 and a retaining pawl 60. The pawl 59 is pivotally mounted at 64 on one arm 61 of a bell crank lever which is pivotally mounted at 62 on an L-shaped bracket 63 fixed to the arm 56. The pawl 60 is pivotally mounted on the bracket 63. A coil spring 65 has one of its ends connected to the tail of the advancing pawl 59 and its other end connected to the second arm 66 of the bell crank lever. Another coil spring 67 has one of its ends connected to the tail of the retaining pawl 60, and its other end secured to the bracket 63. The outer end of the arm 66 of the bell crank is slotted as shown at 68 to cooperate with a pin 69 which extends through this slot and is mounted on a stationary bracket 70 which projects upwardly from the base plate 7.

From the above it will be understood that when the bracket 63 is rocked with the arm 56, the stationary pin 69 will cause the bell crank to move in a counter-clockwise direction as viewed in Fig. 5, with the result that the pawls will be moved toward the left to cause them to ratchet on the rack 58 and to move the platen carriage one step forwardly when the bell crank lever is returned to the normal position shown in Fig. 5.

In order to release the pawls from the lock to allow shifting of the platen carriage whenever desired, a U-shaped member 71 has its ends pivotally connected at 72 to the frame of the platen carriage. The bar is substantially co-extensive with the platen and when it is rocked in the counter-clockwise direction, illustrated by the arrow in Fig. 3, it comes in contact with pins 73 and 74 which project upwardly from the tails of the pawls and this results in swinging these pawls about the pivot 64, as is illustrated in Fig. 6.

Ink may be supplied to the type unit by any suitable means, and for the purpose of disclosing the present invention, we have shown the unit cooperating with an ink cylinder 75 pivotally mounted on a bracket 76 supported by the member 27.

In operation, it will be assumed that the parts are in the position shown in Fig. 1 and it is desired to impress the small case letter "j" on the paper on the platen. The typist with his fingers upon the keyboard simply shifts the board to the left until this letter in the row 18 registers with the pointer 19. As he does so, the rack 31 turns the cog wheel 30 and effects corresponding movement of the type wheel. When the letter "j" coincides with the pointer 19, the roller of the detent will temporarily lock the type wheel against further movement, and the operator now depresses the board 16, and this causes the platen to move the paper into contact with small case letter "j" on the type wheel. Upon release of pressure on the keyboard the springs 50 return the latter to its normal position.

If an upper case letter is to be printed, the operator prior to depressing the keyboard will depress one of the shift keys 41, so that this will elevate the type wheel and place it in position to print the upper case letter on the paper.

Of course, each depression of the board 16 causes the escapement mechanism to feed the platen one step, and when it is desired to place a space between characters impressed on the paper, the bar 46 is depressed and this causes advancement of the platen carriage with the paper on the platen coming into contact with the type wheel.

While we have disclosed suitable mechanism forming one embodiment of our invention, we are aware that the invention may be incorporated in other embodiments and changes may be made in the details disclosed without departing from the spirit of the invention as expressed in the claims.

What we claim and desire to secure by Letters Patent is:

1. A typewriter of the character described comprising a laterally shiftable and depressible dummy keyboard having key characters thereon, a stationary indicator cooperating with the characters on the keyboard, a type unit movable under the influence of the keyboard when said board is shifted laterally in either direction, a platen, and means cooperating with the keyboard and platen for causing the latter to move into contact with the type unit upon depression of the keyboard.

2. A typewriter of the character described comprising a laterally shiftable and depressible dummy keyboard having key characters thereon, a row of corresponding characters extending longitudinally of said keyboard, a stationary indicator cooperating with the characters on the keyboard, a type unit movable under the influence of the keyboard when said board is shifted laterally in either direction, a platen, and means cooperating with the keyboard and platen for causing the latter to move into contact with the type unit upon depression of the keyboard.

3. A typewriter of the character described comprising a laterally shiftable and depressible dummy keyboard having key characters thereon, a stationary indicator cooperating with the characters on the keyboard, a type unit movable under the influence of the keyboard when said board is shifted laterally in either direction, a platen, means cooperating with the keyboard and platen for causing the latter to move into contact with the type unit upon depression of the keyboard, and an escapement mechanism cooperating with the last mentioned means for laterally shifting the platen each time the keyboard is depressed.

4. A typewriter of the character decribed comprising a laterally shiftable and depressible dummy keyboard having key characters thereon, a stationary indicator cooperating with the characters on the keyboard, a type unit movable under the influence of the keyboard when said board is shifted laterally in either direction, a platen, and means cooperating with the keyboard and platen for causing the latter to move into contact with the type unit upon depression of the keyboard, the last mentioned means including oppositely disposed rockable levers supporting the keyboard, and members movable with said levers and supporting the platen.

5. A typewriter of the character described comprising a laterally shiftable and depressible dummy keyboard having key characters thereon, a stationary indicator cooperating with the characters on the keyboard, a type unit movable under the influence of the keyboard when said board is shifted laterally in either direction, a platen, and means cooperating with the keyboard and platen for causing the latter to move into contact with the type unit upon depression of the keyboard, the last mentioned means comprising oppositely disposed rockable levers, and guide members carried by said levers and slidably supporting the keyboard.

6. A typewriter of the character described, comprising a laterally shiftable and depressible dummy keyboard having key characters thereon, a stationary indicator cooperating with the characters on the keyboard, a type unit movable under the influence of the keyboard when said board is shifted laterally in either direction, a platen, and means cooperating with the keyboard and platen for causing the latter to move into contact with the type unit upon depression of the keyboard, the last mentioned means including forwardly projecting oppositely disposed levers movable about a horizontal axis and supporting the keyboard, and means movable with said levers, projecting rearwardly from said axis and supporting said platen.

7. A typewriter of the character described comprising a laterally shiftable and depressible dummy keyboard having key characters thereon, a stationary indicator cooperating with the characters on the keyboard, a type unit movable under the influence of the keyboard when said board is shifted laterally in either direction, a platen, means cooperating with the keyboard and platen for causing the latter to move into contact with the type unit upon depression of the keyboard, said type unit having an annular row of upper case type and an annular row of lower case type, and means for shifting said type unit relatively to the platen for bringing either of said rows into position to cooperate with the platen.

8. A typewriter comprising a type unit provided with annular rows of upper case characters and lower case characters, a laterally shiftable and depressible dummy keyboard operatively connected with the unit for bringing any of said characters to a predetermined spot upon lateral shifting of the keyboard, a platen, and means actuated by the keyboard for moving the platen toward said spot upon depression of the keyboard.

9. A typewriter comprising a dummy keyboard having key characters arranged thereon, a stationary indicator cooperating with the characters on the dummy keyboard, said dummy keyboard being mounted for lateral displacement and for depression, a type unit operatively connected with the dummy keyboard for moving the type unit when the keyboard is shifted laterally, a platen movable toward and away from the type unit, and means for operatively connecting the keyboard and platen for shifting the latter when the keyboard is depressed, an escapement mechanism for shifting the platen axially each time the keyboard is depressed, and a shift bar cooperating with the last mentioned means for operating the escapement mechanism each time the shift bar is depressed.

10. In a typewriter, pivotally mounted levers, a dummy keyboard slidably mounted on said levers, a type member, means operatively connecting the type member to the keyboard for causing movement of the type member when the keyboard is shifted laterally, a platen member cooperating with the type member, means for causing one of said members to move into contact with the other when the keyboard is depressed, escapement mechanism cooperating with said levers for shifting the platen axially each time one of said members moves into contact with the other, a horizontally disposed rod supported by said levers, second pivotally mounted levers resting on said rod, a shift bar supported by the second levers, yielding means for normally holding all of the levers in elevated positions, and stop means for limiting downward movement of the second levers.

11. A typewriter comprising a laterally displaceable and depressible dummy keyboard, rockable levers supporting the keyboard, a type unit, means operatively connecting the type unit to the keyboard for movement by the latter when the dummy keyboard is shifted laterally, a platen movable toward and away from the type unit, means operatively connected to the levers for supporting the platen, escapement mechanism cooperating with the last mentioned means for shifting the platen axially each time the keyboard is depressed, and means operating independently of the keyboard for shifting the type unit relatively to the platen.

12. A typewriter comprising a rockable support, a platen, a platen carriage slidably mounted on the support and provided with a rack, a bell crank lever pivotally mounted on the rockable support and shiftable bodily with the latter, an advancing pawl for the rack pivotally connected with one arm of the bell crank lever, a retaining pawl for the rack pivotally connected to the rockable support and positioned immediately below the advancing pawl, a spring connecting one end of the advancing pawl to the other arm of the bell crank lever for normally urging the advancing pawl into engagement with the teeth of the rack, another spring connecting the retaining pawl to the rockable support for normally urging the retaining pawl into engagement with the same teeth of the rack, and means for causing the bell crank to turn about its pivotal mounting when the bell crank is moved in one direction with the rockable support whereby the pawls cooperate with the rack to feed the carriage step by step.

13. A typewriter comprising a rockable support, a platen, a platen carriage slidably mounted on the support and provided with a rack, a bell crank lever pivotally mounted on the rockable support and shiftable bodily with the latter, an advancing pawl for the rack pivotally connected with one arm of the bell crank lever, a retaining pawl for the rack pivotally connected to the rockable support and positioned immediately below the advancing pawl, a spring connecting one end of the advancing pawl to the other arm of the bell crank lever for normally urging the advancing pawl into engagement with the teeth of the rack, another spring connecting the retaining pawl to the rockable support for normally urging the retaining pawl into engagement with the same teeth of the rack, means for causing the bell crank to turn about its pivotal mounting when the bell crank is moved in one direction with the rockable support whereby the pawls cooperate with the rack to feed the carriage step by step, and means cooperating with the pawls for disengaging them from the rack when it is desired to shift the platen carriage without interference by the rack and pawl mechanism.

14. A typewriter comprising pivotally mounted rocking levers, a dummy keyboard slidably mounted on said levers, a rotatable and axially movable type unit, means operatively connecting the unit to the keyboard for setting the unit in accordance with lateral movements of the keyboard, a platen operatively connected to said levers and movable toward and away from the type unit, escapement mechanism for the platen operatively connected to the last mentioned means for moving the platen axially step by step each time the keyboard is depressed, a horizontal bar connecting said levers, second pivotally mounted levers engaging said bar, and a spacing bar carried by the second levers.

15. A typewriter comprising pivotally mounted rocking levers, a dummy keyboard slidably mounted on said levers, a rotatable and axially movable type unit, means operatively connecting the unit to the keyboard for setting the unit in accordance with lateral movements of the keyboard, a platen operatively connected to said levers and movable toward and away from the type unit, escapement mechanism for the platen operatively connected to the last mentioned means for moving the platen axially step by step each time the keyboard is depressed, a horizontal bar connecting said levers, second pivotally mounted levers engaging said bar, a spacing bar carried by the second levers, and means for axially shifting the type unit comprising pivotally mounted third levers extending over said rod, and a shift key carried by each of the third levers.

16. A typewriter comprising pivotally mounted rocking levers, a dummy keyboard slidably mounted on said levers, a rotatable and axially movable type unit, means operatively connecting the unit to the keyboard for setting the unit in accordance with lateral movements of the keyboard, a platen operatively connected to said levers and movable toward and away from the type unit, escapement mechanism for the platen operatively connected to the last mentioned means for moving the platen axially step by step each time the keyboard is depressed, a horizontal bar connecting said levers, second pivotally mounted levers engaging said bar, a spacing bar carried by the second levers, and means for axially shifting the type unit comprising pivotally mounted third levers extending over said rod, and a shift key carried by each of the third levers, each of the third levers being shaped to permit depression thereof without causing the lever to contact with said rod.

17. A typewriter comprising a laterally shiftable and depressible dummy keyboard having key characters thereon, a stationary indicator cooperating with the characters on the dummy keyboard, a type wheel provided with an annular row of upper case characters and an annular row of lower case characters, a stationary support, a shaft fixed to said wheel and journaled in said support for rotatable and axial movement, means operatively connecting said shaft to the dummy keyboard for causing turning of the wheel when the keyboard is shifted laterally in either direction, means for temporarily latching the shaft in various positions, rockable levers pivotally mounted below the wheel and slidably supporting the dummy keyboard, a platen operatively connected with the levers and shiftable into contact with the type wheel upon depression of the keyboard, and escapement mechanism for the platen operatively connected with the last mentioned means.

18. A typewriter comprising a laterally shiftable and depressible dummy keyboard having key characters thereon, a stationary indicator cooperating with the characters on the dummy keyboard, a type wheel provided with an annular row of upper case characters and an annular row of lower case characters, a stationary support, a shaft fixed to said wheel and journaled in said support for rotatable and axial movement, means operatively connecting said shaft to the dummy keyboard for causing turning of the wheel when the keyboard is shifted laterally in either direction, means for temporarily latching the shaft in various positions, rockable levers pivotally mounted below the wheel and slidably supporting the dummy keyboard, a platen operatively connected with the levers and shiftable into contact with the type wheel upon depression of the keyboard, an escapement mechanism for the platen operatively connected with the last mentioned means, and manually controlled means operating independently of the levers for moving the type wheel shaft axially.

J. LEE SWEENEY.
HARRY BATES.